(12) United States Patent
Liu

(10) Patent No.: US 12,420,810 B2
(45) Date of Patent: Sep. 23, 2025

(54) VEHICLE TRAVEL CONTROL SYSTEM

(71) Applicant: TOYOTA JIDOSHA KABUSHIKI KAISHA, Toyota (JP)

(72) Inventor: Yanqing Liu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 18/321,031

(22) Filed: May 22, 2023

(65) Prior Publication Data

US 2024/0001937 A1 Jan. 4, 2024

(30) Foreign Application Priority Data

Jun. 30, 2022 (JP) .................. 2022-105929

(51) Int. Cl.
*B60W 40/107* (2012.01)
*B60W 40/11* (2012.01)
*B60W 40/112* (2012.01)

(52) U.S. Cl.
CPC .......... *B60W 40/107* (2013.01); *B60W 40/11* (2013.01); *B60W 40/112* (2013.01); *B60W 2420/00* (2013.01)

(58) Field of Classification Search
CPC .. B60W 40/107; B60W 40/11; B60W 40/112; B60W 2420/00; B60W 2422/00; B60W 2520/00; B60W 40/10; B60W 40/00; B60W 40/13; B60W 50/00; B60W 2040/1315; B60W 2050/0002
See application file for complete search history.

(56) References Cited

U.S. PATENT DOCUMENTS

2019/0001781 A1 1/2019 Furuta
2019/0389473 A1* 12/2019 Chen .................... B60T 8/3205

FOREIGN PATENT DOCUMENTS

| JP | 2006-264367 A | 10/2006 |
| JP | 2009-006882 A | 1/2009 |
| JP | 2019-010912 A | 1/2019 |
| JP | 2021-49992 A | 4/2021 |

* cited by examiner

*Primary Examiner* — Abby J Flynn
*Assistant Examiner* — Paulo Roberto Gonzalez Leite
(74) *Attorney, Agent, or Firm* — Sughrue Mion, PLLC

(57) ABSTRACT

Out of two areas divided by a virtual line passing through the center of gravity position in the front-back direction of a vehicle, a second acceleration sensor is arranged in an area different from the area where a first acceleration sensor is arranged. Out of two areas divided by a virtual line passing through the center of gravity position in the vehicle width direction, the third acceleration sensor is arranged in an area different from the area where the first acceleration sensor is arranged. At least one of the following conditions is satisfied: the first condition where the third acceleration sensor is located between the first acceleration sensor and the second acceleration sensor in the vehicle width direction; and the second condition where the second acceleration sensor is located between the first acceleration sensor and the third acceleration sensor in the front-back direction of the vehicle.

2 Claims, 16 Drawing Sheets (COMPARATIVE EXAMPLE)

VEHICLE TRAVEL CONTROL SYSTEM

The disclosure of Japanese Patent Application No. 2022-105929 filed on Jun. 30, 2022 including the specification, drawings and abstract is incorporated herein by reference in its entirety.

BACKGROUND

1. Technical Field

The present disclosure relates to a vehicle travel control system.

2. Description of the Related Art

JP 2009-006882 discloses a technology of arranging vertical acceleration sensors at three locations corresponding to a right front wheel, a left rear wheel, and a right rear wheel and calculating bounce acceleration, pitching angular acceleration, and roll angular acceleration at the center of gravity of the vehicle based on the detected values from these sensors. Based on the calculated bounce acceleration, etc., the hydraulic cylinder of the suspension is controlled.

The technology according to JP 2009-006882, for example, does not use detected values from the vertical acceleration sensor corresponding to the right front wheel in order to calculate the roll angular acceleration at the center of gravity position. Therefore, the accuracy of the roll angular acceleration and the like at the center of gravity position may be low.

SUMMARY

A purpose of the present disclosure is to provide a technology that allows more accurate state quantities at the center of gravity position to be acquired using three acceleration sensors arranged in a vehicle.

A vehicle travel control system according to one embodiment of the present disclosure includes: a first acceleration sensor arranged closer to one wheel than the center of gravity position of a sprung structure of a vehicle, the first acceleration sensor detecting vertical acceleration; a second acceleration sensor arranged in an area different from an area where the first acceleration sensor is arranged, out of two areas divided by a virtual line passing through the center of gravity position in the front-back direction of the vehicle, the second acceleration sensor detecting vertical acceleration; a third acceleration sensor arranged in an area different from an area where the first acceleration sensor is arranged, out of two areas divided by a virtual line passing through the center of gravity position in the vehicle width direction, the third acceleration sensor detecting vertical acceleration; and a control device configured to derive heave acceleration, roll angular acceleration, and pitch angular acceleration at the center of gravity position based on the vertical acceleration detected by each of the first acceleration sensor, the second acceleration sensor, and the third acceleration sensor. At least one of the following conditions is satisfied: a first condition where the third acceleration sensor is located between the first acceleration sensor and the second acceleration sensor in the vehicle width direction; and a second condition where the second acceleration sensor is located between the first acceleration sensor and the third acceleration sensor in the front-back direction of the vehicle.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Various embodiments now will be described. The embodiments are illustrative and are not intended to be limiting.

Figure 1:
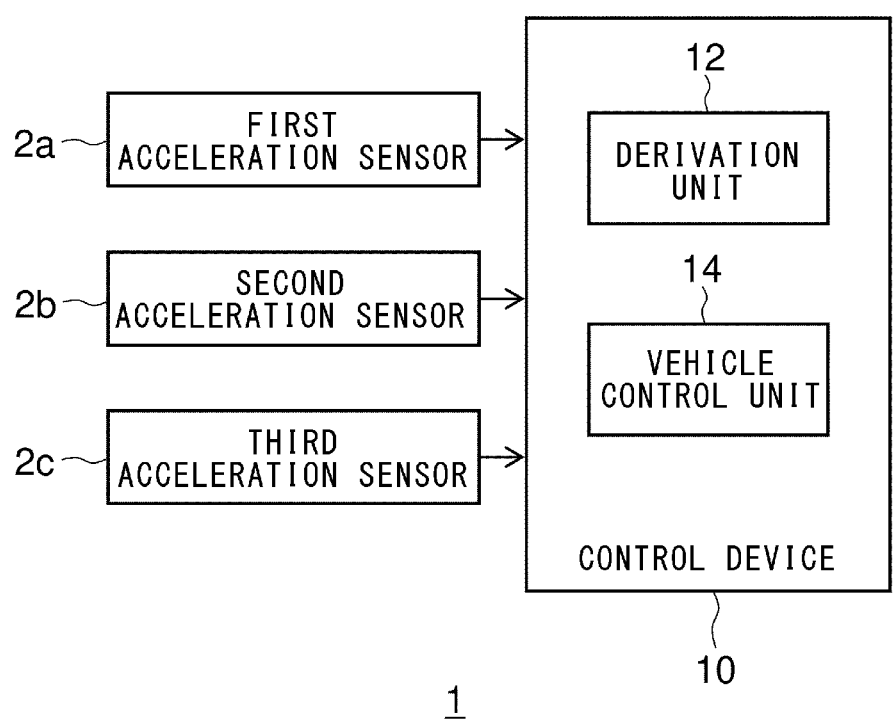
FIG. 1 is a diagram illustrating the configuration of a vehicle travel control system according to an embodiment.

FIG. 1 shows the configuration of a vehicle travel control system 1 according to an embodiment. The vehicle travel control system 1 is installed in a vehicle such as an automobile and controls the travel of the vehicle. The vehicle may be a vehicle driven by a driver or a self-driving vehicle.

The vehicle travel control system 1 has a first acceleration sensor 2a, a second acceleration sensor 2b, a third acceleration sensor 2c, and a control device 10. The first through third acceleration sensors 2a through 2c are collectively referred to as acceleration sensors 2. The three acceleration sensors 2 are installed on a sprung structure of the vehicle, detect the vertical acceleration at the installation position, and output information of the detected vertical acceleration to the control device 10. The vehicle travel control system 1 is not provided with any acceleration sensors that detect vertical acceleration other than the first to third acceleration sensors 2a to 2c. Therefore, the cost can be reduced compared to the cost required when installing four acceleration sensors.

The control device 10 controls the traveling of the vehicle based on the vertical acceleration detected by each of the three acceleration sensors 2. The control device 10 is also called an electronic control unit (ECU). The control device 10 has a derivation unit 12 and a vehicle control unit 14.

The configuration of the control device 10 is implemented in hardware by any CPU of a computer, memory or other LSI's, and in software by a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

The derivation unit 12 derives the heave acceleration, roll angular acceleration, and pitch angular acceleration at the center of gravity position of the sprung structure of the vehicle based on the vertical acceleration detected by each of the first acceleration sensor 2a, the second acceleration sensor 2b, and the third acceleration sensor 2c. It can be also considered that the derivation unit 12 converts the vertical acceleration detected at each of the three acceleration sensors 2 into heave acceleration and so on. The heave acceleration, roll angular acceleration, and pitch angular acceleration at the center of gravity position are also called the state quantities at the center of gravity position. The derivation unit 12 supplies the derived state quantities to the vehicle control unit 14.

The vehicle control unit 14 controls the traveling of a vehicle 30 based on the derived heave acceleration, roll angular acceleration, and pitch angular acceleration at the center of gravity position g1. Known techniques can be used for traveling control based on these state quantities. For example, the vehicle control unit 14 can control the damping force of a shock absorber of each suspension of the vehicle based on the state quantities to further stabilize the posture of the vehicle and achieve ride comfort and steering stability.

Based on the derived heave acceleration, roll angular acceleration, and pitch angular acceleration at the center of gravity position, the derivation unit 12 may derive the vertical acceleration of the sprung structure at each wheel position, using known techniques. In this case, the vehicle control unit 14 may control the traveling of the vehicle using known techniques based on the vertical acceleration at each wheel position.

In the embodiment, three acceleration sensors 2 are arranged at positions where the accuracy of state quantities that are derived can be improved. The first, second, and third arrangements of the three acceleration sensors 2 are described below.

Figure 2:
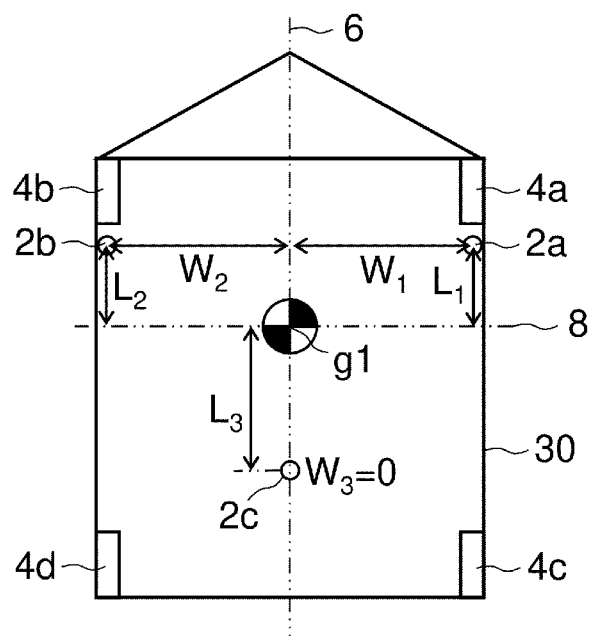
FIG. 2 is a diagram schematically showing the first arrangement of acceleration sensors shown in FIG. 1.
Figure 2:

FIG. 2 is a diagram schematically showing the first arrangement of the acceleration sensors 2 shown in FIG. 1. FIG. 2 is a top view of a vehicle 30. A right front wheel 4a, a left front wheel 4b, a right rear wheel 4c, and a left rear wheel 4d of the vehicle 30 are collectively referred to as wheels 4.

The first acceleration sensor 2a is arranged closer to the right front wheel 4a than the center of gravity position g1 of the sprung structure of the vehicle 30. The first acceleration sensor 2a is arranged near the right front wheel 4a. The distance in the vehicle width direction from the center of gravity position g1 to the first acceleration sensor 2a is denoted as $W_1$, and the distance in the front-back direction of the vehicle from the center of gravity position g1 to the first acceleration sensor 2a is denoted as $L_1$. It is preferable that $W_1$ and $L_1$ are larger. This is because the accuracy of the state quantities at the center of gravity position g1 can be improved.

Out of two areas divided by a virtual line 6 passing through the center of gravity position g1 in the front-back direction of the vehicle, the second acceleration sensor 2b is arranged in an area different from the area where the first acceleration sensor 2a is arranged. Since the first acceleration sensor 2a is arranged in the area to the right of the virtual line 6, the second acceleration sensor 2b is arranged in the area to the left of the virtual line 6. The second acceleration sensor 2b is arranged near the left front wheel 4b.

The distance in the vehicle width direction from the center of gravity position g1 to the second acceleration sensor 2b is denoted as $W_2$, and the distance in the front-back direction of the vehicle from the center of gravity position g1 to the second acceleration sensor 2b is denoted as $L_2$. It is preferable that $W_2$ and $L_2$ are larger. This is because the accuracy of the state quantities at the center of gravity position g1 can be improved. It is assumed that $W_1$ and $W_2$ are approximately equal and that $L_1$ and $L_2$ are approximately equal.

Out of two areas divided by a virtual line 8 passing through the center of gravity position g1 in the vehicle width direction, the third acceleration sensor 2c is arranged in an area different from the area where the first acceleration sensor 2a is arranged. Since the first acceleration sensor 2a is arranged in the area in the front side of the virtual line 8, the third acceleration sensor 2c is arranged in the area in the rear side of the virtual line 8.

The third acceleration sensor 2c is located between the first acceleration sensor 2a and the second acceleration sensor 2b in the vehicle width direction. In the example shown in the figure, the third acceleration sensor 2c is located at an intermediate position between the first acceleration sensor 2a and the second acceleration sensor 2b in the vehicle width direction.

The distance in the vehicle width direction from the center of gravity position g1 to the third acceleration sensor 2c is denoted as $W_3$, and the distance in the front-back direction of the vehicle from the center of gravity position g1 to the third acceleration sensor 2c is denoted as $L_3$. It is preferable that $L_3$ is larger. This is because the accuracy of the state quantities at the center of gravity position g1 can be improved. In the example shown in the figure, $W_3$ is zero. In other words, the third acceleration sensor 2c is arranged on the virtual line 6.

Figure 3A:
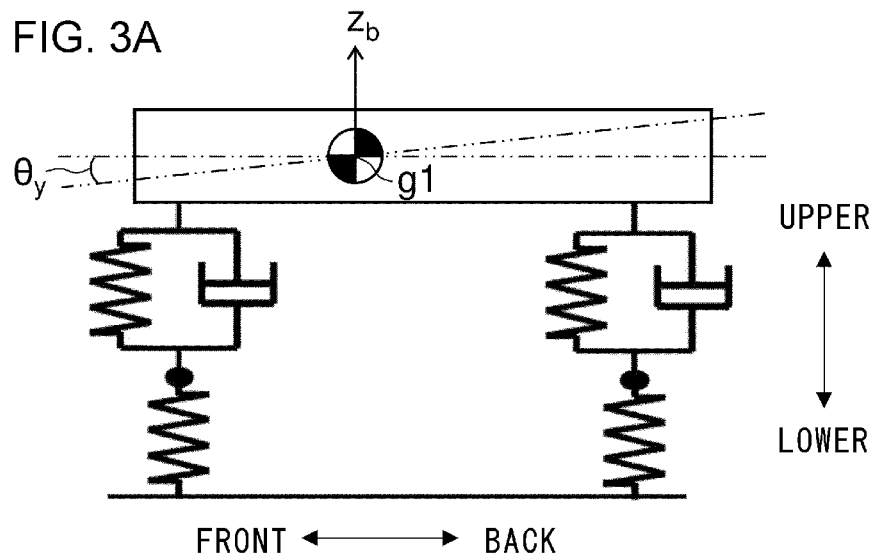
FIG. 3A is a side view for explaining the heave acceleration at the center of gravity position and a pitch angle of a vehicle shown in FIG. 2.
Figure 3B:
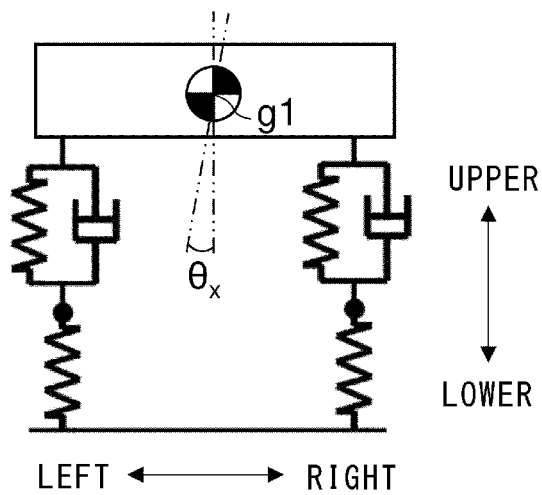
FIG. 3B is a view of the vehicle from the rear for explaining a roll angle.

FIG. 3A is a side view for explaining the heave acceleration $z_b$ at the center of gravity position g1 and the pitch angle $\theta_y$ of the vehicle 30 shown in FIG. 2, and FIG. 3B is a view of the vehicle 30 from the rear for explaining the roll angle $\theta_x$.

First vertical acceleration $z_{s1}$ detected by the first acceleration sensor 2a can be expressed by the following Equation (1) using the heave acceleration $z_b$ at the center of gravity position g1, pitch angular acceleration $\theta_y''$ at the center of gravity position g1, and roll angular acceleration $\theta_x''$ at the center of gravity position g1. Second vertical acceleration $z_{s2}$ detected by the second acceleration sensor 2b can be expressed by the following Equation (2), and third vertical acceleration $z_{s3}$ detected by the third acceleration sensor 2c can be expressed by the following Equation (3).

Expression 1

$$z_{s1} = z_b - W_1\theta_x'' - L_1\theta_y'' \quad \text{Equation (1)}$$

$$z_{s2} = z_b - W_2\theta_x'' - L_2\theta_y'' \quad \text{Equation (2)}$$

$$z_{s3} = z_b - W_3\theta_x'' - L_3\theta_y'' \quad \text{Equation (3)}$$

Based on these equations (1) to (3), the heave acceleration $z_b$, the pitch angular acceleration $\theta_y''$, and the roll angular acceleration $\theta_x''$ at the center of gravity position g1 can be expressed by the following Equations (4) to (6).

Expression 2

$$z_b = \frac{(L_3W_2 - L_2W_3)z_{s1} + (L_1W_3 + L_3W_1)z_{s2} + (L_1W_2 + L_2W_1)z_{s3}}{(L_1+L_3)W_2 + (L_2+L_3)W_1 + (L_1-L_2)W_3} \quad \text{Equation (4)}$$

$$\theta_x'' = \frac{-(L_2+L_3)z_{s1} + (L_1+L_3)z_{s2} + (L_2-L_1)z_{s3}}{(L_1+L_3)W_2 + (L_2+L_3)W_1 + (L_1-L_2)W_3} \quad \text{Equation (5)}$$

$$\theta_y'' = \frac{-(W_2+W_3)z_{s1} + (W_3-W_1)z_{s2} + (W_1+W_2)z_{s3}}{(L_1+L_3)W_2 + (L_2+L_3)W_1 + (L_1-L_2)W_3} \quad \text{Equation (6)}$$

The values of $W_1$, $W_2$, $W_3$, $L_1$, $L_2$, and $L_3$ are stored in advance in the memory of the control device 10, which is not shown. The derivation unit 12 derives the heave acceleration $z_b$, the roll angular acceleration $\theta_x''$, and the pitch angular acceleration $\theta_y''$ at the center of gravity position g1 based on the first vertical acceleration $z_{s1}$, the second vertical acceleration $z_{s2}$, the third vertical acceleration $z_{s3}$, $W_1$, $W_2$, $W_3$, $L_1$, $L_2$, $L_3$, and Equations (4) to (6).

In the first arrangement, since $W_3$ is zero, "$W_3-W_1$" is equal to $-W_1$ and not zero. Therefore, in the previously mentioned equation (6), the coefficient of the second vertical acceleration $z_{s2}$ is not zero. The respective coefficients of the first vertical acceleration $z_{s1}$ and the third vertical acceleration $z_{s3}$ in Equation (6) are also not zero. Therefore, the value of the pitch angular acceleration $\theta_y''$ reflects the vertical acceleration detected by each of the three acceleration sensors 2, thereby resulting in a relatively small error from the true value. The true value is obtained by arranging an acceleration sensor near each of the four wheels 4 and converting the vertical acceleration detected by each of the four acceleration sensors into a state quantity at the center of gravity position g1 using a known conversion formula. The true value roughly matches the actual state quantity at the center of gravity position g1.

Further, since $W_3$ is zero, "$L_3W_2-L_2W_3$" is equal to $L_3W_2$ and not zero. Therefore, in the previously mentioned equation (4), the coefficient of the first vertical acceleration $z_{s1}$ is not zero. The respective coefficients of the second vertical acceleration $z_{s2}$ and the third vertical acceleration $z_{s3}$ in Equation (4) are also not zero. Therefore, the value of the heave acceleration $z_b$ reflects the vertical acceleration detected by each of the three acceleration sensors 2, thereby resulting in a relatively small error from the true value.

On the other hand, since $L_1$ is approximately equal to $L_2$, "$L_2-L_1$" is approximately zero. Therefore, in the previously mentioned equation (5), the coefficient of the third vertical acceleration $z_{s3}$ becomes approximately zero. Therefore, the roll angular acceleration $\theta_x''$ becomes substantially unrelated to the detected third vertical acceleration $z_{s3}$, and the error from the true value is likely to become relatively large.

Figure 4A:
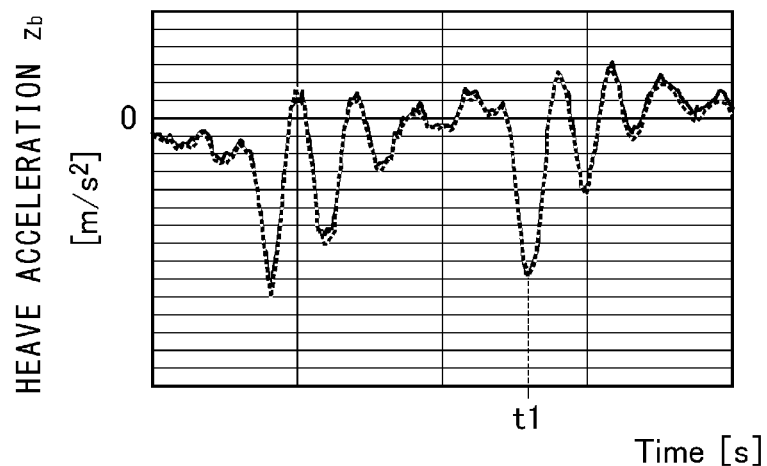
FIGS. 4A to 4C are diagrams showing time changes of state quantities obtained in the first arrangement in FIG. 2 and the true values of the state quantities.
Figure 4B:
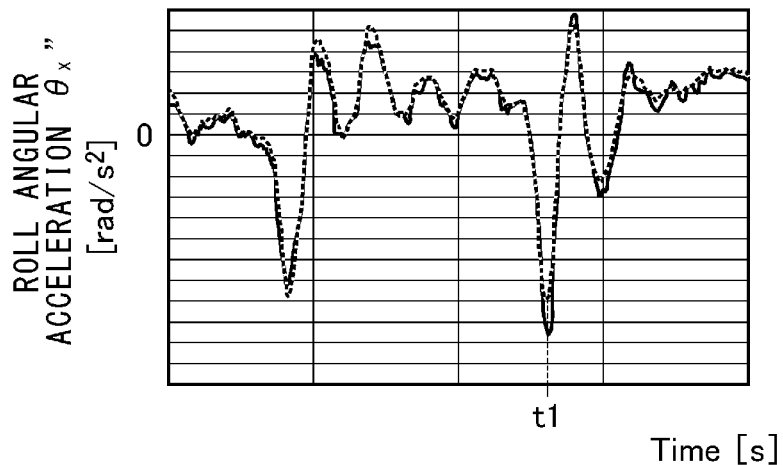
Figure 4C:
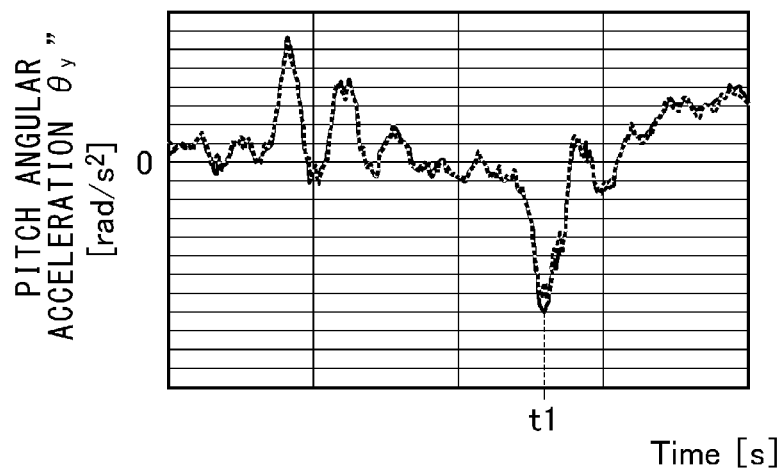

FIGS. 4A to 4C show time changes of state quantities obtained in the first arrangement in FIG. 2 and the true values of the state quantities. FIG. 4A shows the heave acceleration $z_b$, FIG. 4B shows the roll angular acceleration $\theta_x''$, and FIG. 4C shows the pitch angular acceleration $\theta_y''$.

In FIGS. 4A to 4C, solid waveforms represent state quantities obtained in the first arrangement, and dashed waveforms represent true values. These figures show state quantities derived in a situation where the two left wheels 4 have passed over a stepped road surface while the vehicle 30 is traveling at a predetermined speed.

The heave acceleration $z_b$ and the pitch angular acceleration $\theta_y''$ roughly match the respective true values. On the other hand, particularly at time t1 when the left rear wheel 4d runs over a step, the error from the true value of the roll angular acceleration $\theta_x''$ becomes relatively large.

Figure 5A:
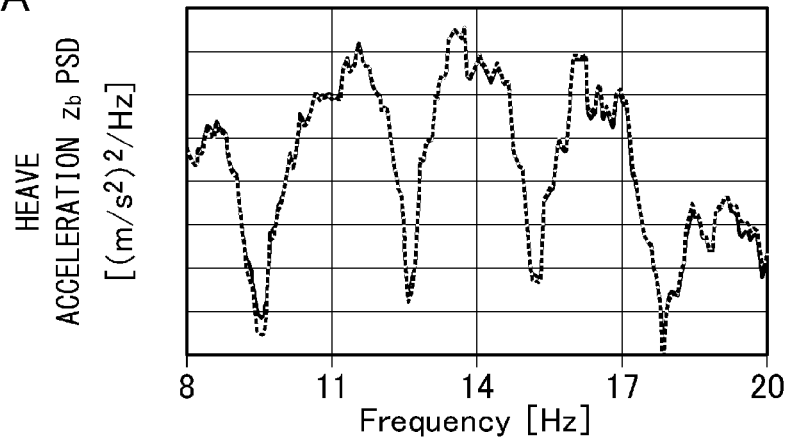
FIGS. 5A to 5C are diagrams showing power spectral densities of the state quantities of FIG. 4A to 4C and the true values of the state quantities.
Figure 5B:
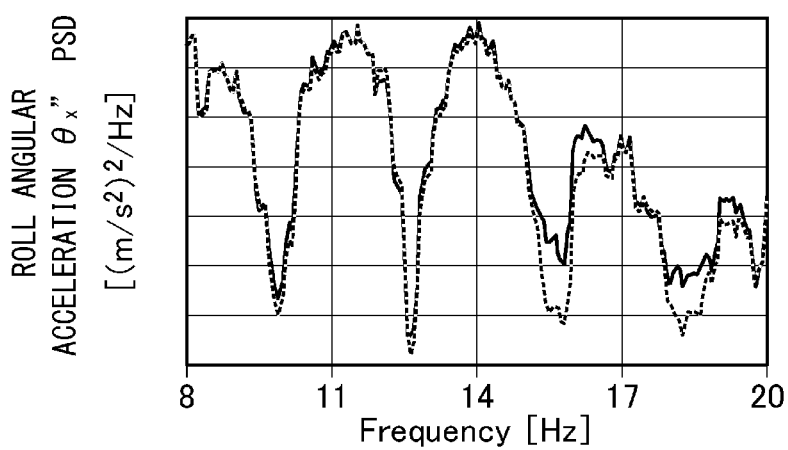
Figure 5C:
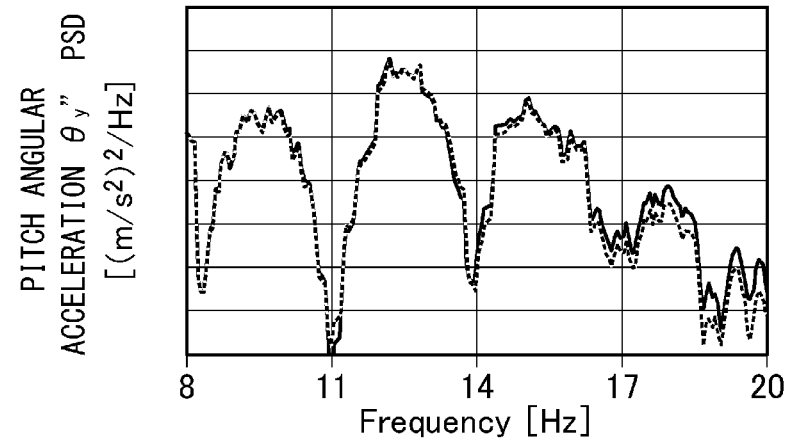

FIGS. 5A to 5C show power spectral densities of the state quantities of FIG. 4A to 4C and the true values of the state quantities. FIG. 5A shows the power spectral density of the heave acceleration $z_b$ of FIG. 4A, FIG. 5B shows the power spectral density of the roll angular acceleration $\theta_x''$ of FIG. 4B, and FIG. 5C shows the power spectral density of the pitch angular acceleration $\theta_y''$ of FIG. 4C. Solid waveforms represent state quantities in the first arrangement, and dashed waveforms represent true values. Vertical axes of the graphs represent the power spectral densities of the state quantities in logarithm, and horizontal axes represent the frequencies.

The respective power spectral densities of the heave acceleration $z_b$ and the pitch angular acceleration $\theta_y''$ relatively match the respective true values. On the other hand, in the power spectrum density of the roll angular acceleration $\theta_x''$, the error from the true value is relatively large depending on the frequency.

Figure 6:
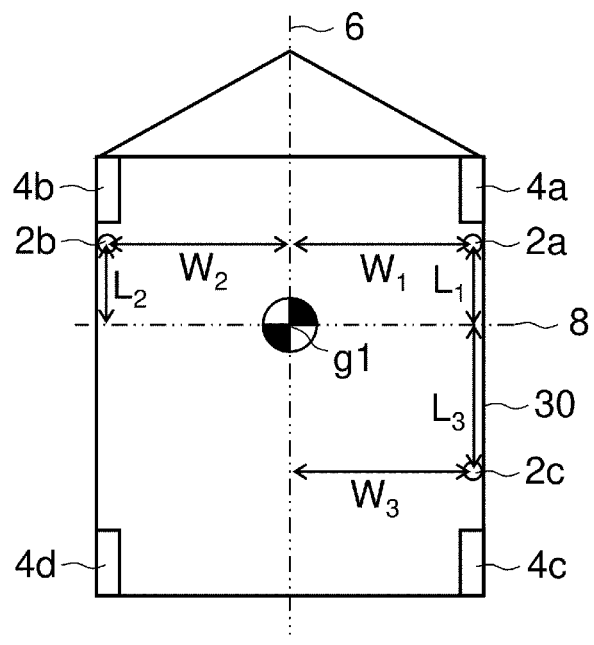
FIG. 6 is a diagram schematically showing the arrangement of acceleration sensors according to a comparative example.
Figure 6:
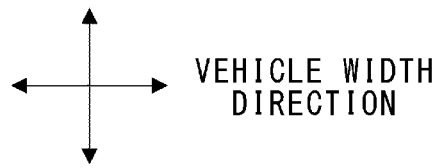

An explanation will now be given regarding the arrangement of acceleration sensors 2 according to a comparative example. FIG. 6 schematically shows the arrangement of the acceleration sensors 2 according to the comparative example. In the comparative example, the arrangement of the third acceleration sensor 2c differs from that in the first arrangement in FIG. 2, and the arrangement of the other two acceleration sensors 2 is the same as that in the first arrangement.

The third acceleration sensor 2c is arranged near the right rear wheel 4c. The third acceleration sensor 2c is not arranged between the first acceleration sensor 2a and the second acceleration sensor 2b in the vehicle width direction, and $W_3$ is equal to $W_1$. In other words, "$W_3-W_1$" is zero. Therefore, in the previously mentioned equation (6), the coefficient of the second vertical acceleration $z_{s2}$ becomes zero. Therefore, the pitch angular acceleration $\theta_y''$ becomes unrelated to the second vertical acceleration $z_{s2}$, and the error from the true value therefore becomes large.

Further, since $W_3$ is also approximately equal to $W_2$ and $L_3$ is approximately equal to $L_2$, "$L_3W_2-L_2W_3$" is approximately zero. Therefore, in the previously mentioned equation (4), the coefficient of the first vertical acceleration $z_{s1}$ becomes approximately zero. Accordingly, the heave acceleration $z_b$ becomes almost unrelated to the first vertical acceleration $z_{s1}$, and the error from the true value becomes large.

The roll angular acceleration $\theta_x''$ becomes almost unrelated to the third vertical acceleration $z_{s3}$ detected by the third acceleration sensor 2c as in the first arrangement according to the embodiment, and the error from the true value becomes large.

Figure 7A:
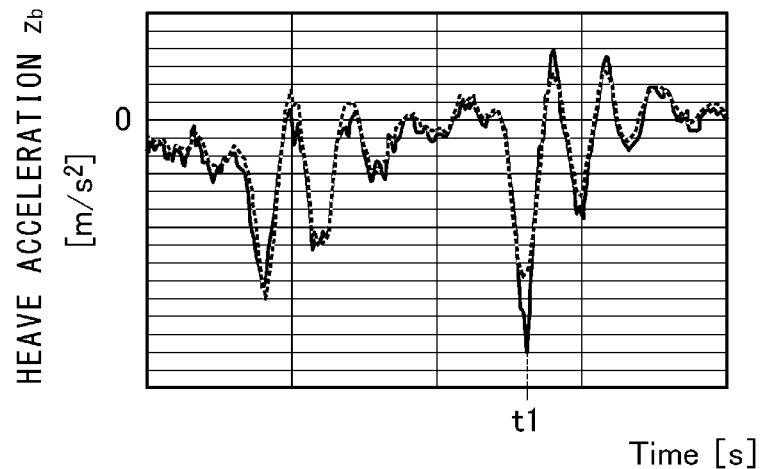
FIGS. 7A to 7C are diagrams showing time changes of state quantities obtained in the arrangement according to the comparative example of FIG. 6 and the true values of the state quantities.
Figure 7B:
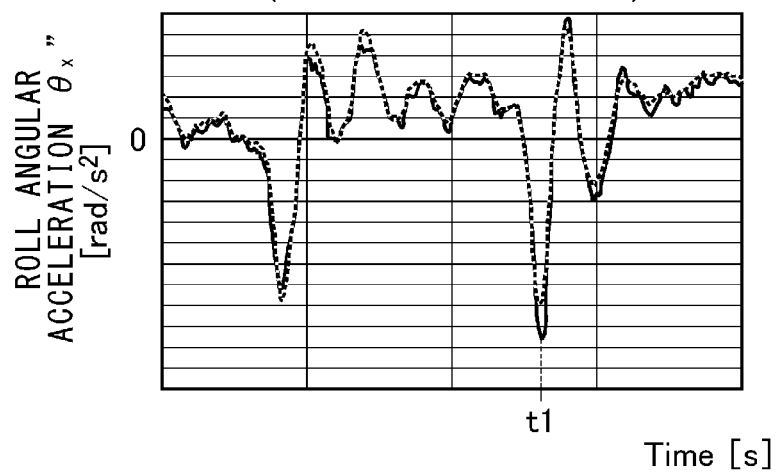
Figure 7C:
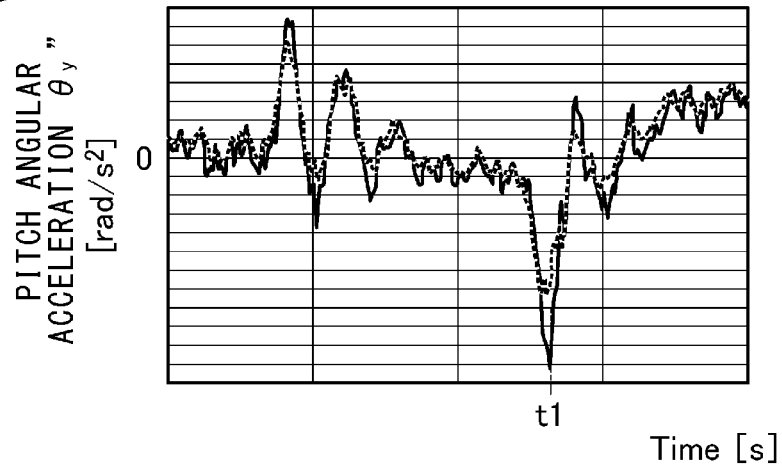

FIGS. 7A to 7C show time changes of state quantities obtained in the arrangement according to the comparative example in FIG. 6 and the true values of the state quantities.

FIG. 7A shows the heave acceleration $z_b$, FIG. 7B shows the roll angular acceleration $\theta_x''$, and FIG. 7C shows the pitch angular acceleration $\theta_y''$.

The errors from the respective true values of the heave acceleration $z_b$ and the pitch angular acceleration $\theta_y''$ are larger than those in the embodiment, and particularly at time t1 when the left rear wheel 4d runs over a step, the errors become larger. The error of roll angular acceleration $\theta_x''$ is equivalent to that according to the embodiment. At the time t1, the absolute value of the heave acceleration $z_b$ is about 40 percent larger, the absolute value of the roll angular acceleration $\theta_x''$ is about 20 percent larger, and the absolute value of the pitch angular acceleration $\theta_y''$ is about percent larger compared to the respective true values.

Figure 8A:
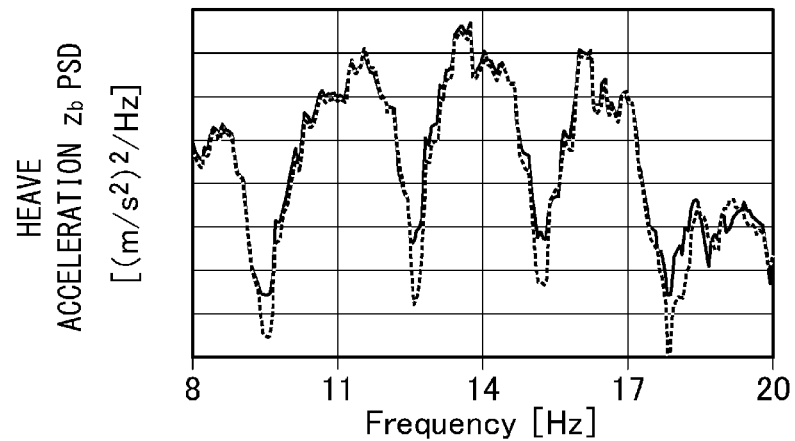
FIGS. 8A to 8C are diagrams showing power spectral densities of the state quantities of FIG. 7A to 7C and the true values of the state quantities.
Figure 8B:
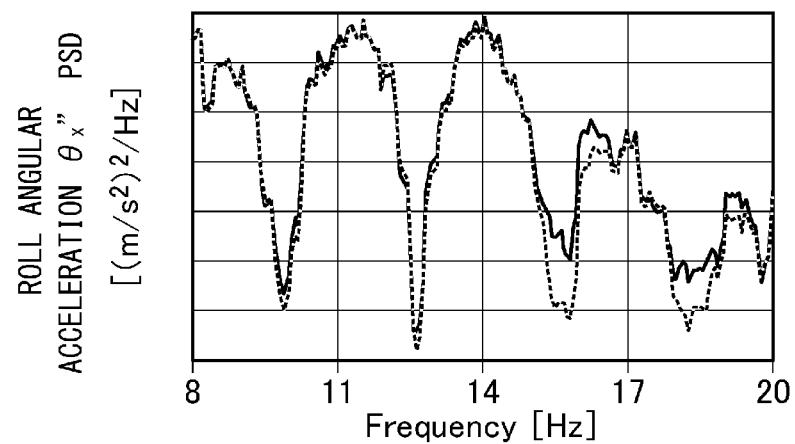
Figure 8C:
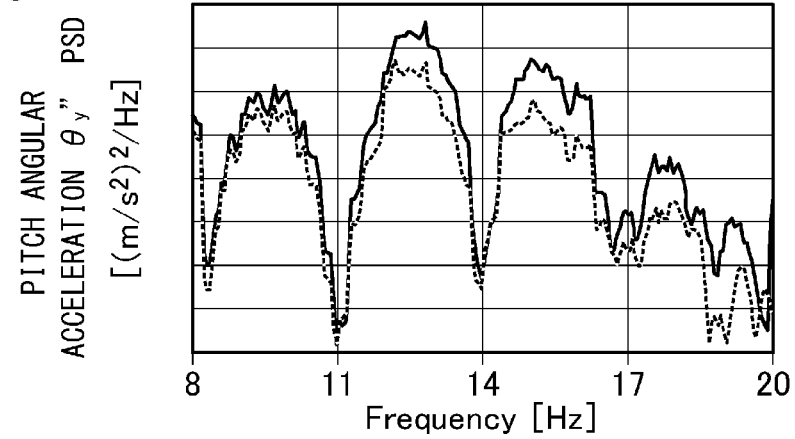

FIGS. 8A to 8C show power spectral densities of the state quantities of FIG. 7A to 7C and the true values of the state quantities. FIG. 8A shows the power spectral density of the heave acceleration $z_b$ of FIG. 7A, FIG. 8B shows the power spectral density of the roll angular acceleration $\theta_x''$ of FIG. 7B, and FIG. 8C shows the power spectral density of the pitch angular acceleration $\theta_y''$ of FIG. 7C.

The power spectral density is also about 5 dB larger for the heave acceleration $z_b$, about 3 dB larger for the roll angular acceleration $\theta_x''$, and about 3 dB larger for the pitch angular acceleration $\theta_y''$ compared to the respective true values.

In contrast to these comparative examples, according to the first arrangement in the embodiment, the heave acceleration $z_b$ and the pitch angular acceleration $\theta y''$ are each closer to the respective true values, and the accuracy is improved, as already mentioned.

By the way, $W_3$ is not limited to zero, and if the third acceleration sensor 2c is arranged between the first acceleration sensor 2a and the second acceleration sensor 2b in the vehicle width direction, the accuracy of state quantities that are derived is higher than that in the comparison example where $W_3$ is equal to $W_1$, and the closer to the intermediate position of these, the higher the accuracy. Therefore, an example of the preferred range of $W_3$ will be explained below.

Denoting the coefficient of the first vertical acceleration $z_{s1}$ as h1, the coefficient of the second vertical acceleration $z_{s2}$ as h2, and the coefficient of the third vertical acceleration $z_{s3}$ as h3, Equation (4) representing the heave acceleration $z_b$ can be expressed by the following Equation (7). These coefficients can also be called conversion coefficients.

$$z_b = h1 * z_{s1} + h2 * z_{s2} + h3 * z_{s3} \quad \text{Equation (7)}$$

Denoting the coefficient of the first vertical acceleration $z_{s1}$ as r1, the coefficient of the second vertical acceleration $z_{s2}$ as r2, and the coefficient of the third vertical acceleration $z_{s3}$ as r3, Equation (5) representing the roll angular acceleration $\theta_x''$ can be expressed by the following Equation (8).

$$\theta_x'' = r1 * z_{s1} + r2 * z_{s2} + r3 * z_{s3} \quad \text{Equation (8)}$$

Denoting the coefficient of the first vertical acceleration $z_{s1}$ as p1, the coefficient of the second vertical acceleration $z_{s2}$ as p2, and the coefficient of the third vertical acceleration $z_{s3}$ as p3, Equation (6) representing the pitch angular acceleration $\theta_y''$ can be expressed by the following Equation (9).

$$\theta_y'' = p1 * z_{s1} + p2 * z_{s2} + p3 * z_{s3} \quad \text{Equation (9)}$$

Figure 9A:
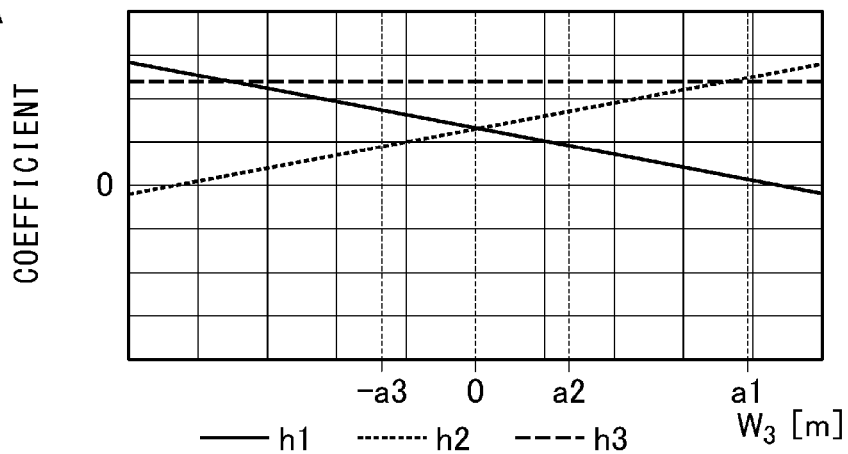
FIGS. 9A to 9C are diagrams showing the relationship between the coefficients of equations representing the state quantities in the first arrangement and $W_3$.
Figure 9B:
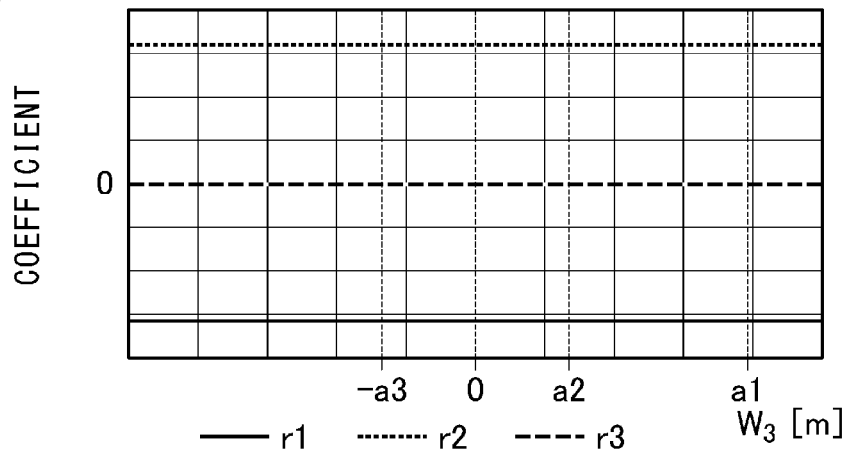
Figure 9C:
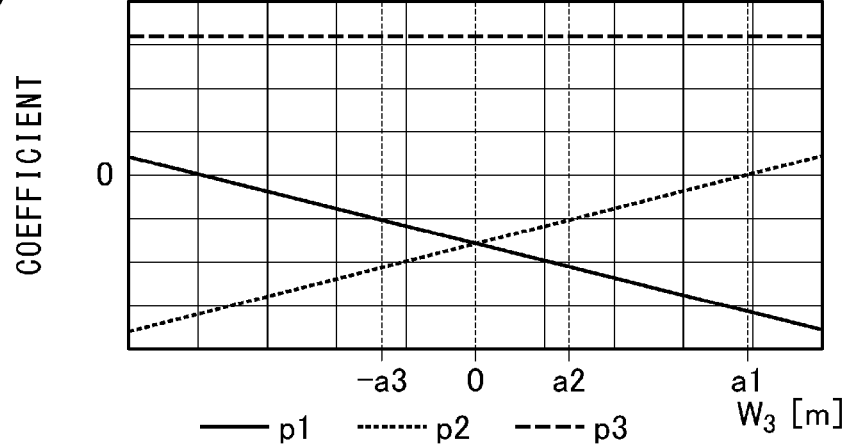

FIGS. 9A to 9C show the relationship between the coefficients of equations representing the state quantities in the first arrangement and $W_3$. FIG. 9A shows the coefficients h1, h2, and h3 in Equation (7) representing the heave acceleration $z_b$. FIG. 9B shows the coefficients r1, r2, and r3 in Equation (8) representing the roll angular acceleration $\theta_x''$. FIG. 9C shows the coefficients p1, p2, and p3 in Equation (9) representing the pitch angular acceleration $\theta_y''$.

In these relationships, $W_1$, $W_2$, $L_1$, $L_2$, and $L_3$ are set to be constant values in the first arrangement, and $W_3$ is changed. The vertical axis in these figures represents the coefficient values, and the horizontal axis represents $W_3$. When the third acceleration sensor 2c is arranged to the right of the virtual line 6 in FIG. 2, $W_3$ is assumed to be a positive value, and when the third acceleration sensor 2c is arranged to the left of the virtual line 6, $W_3$ is assumed to be a negative value. Further, the value of $W_1$ is assumed to be a1. In other words, $W_3$=a1 indicates an arrangement according to the comparative example.

As shown in FIG. 9A, with respect to the heave acceleration $z_b$, the smaller $W_3$ is, the smaller the coefficient h2 becomes and the larger the coefficient h1 becomes. In other words, the coefficients h1 and h2 are each determined according to the position of the third acceleration sensor 2c in the vehicle width direction. When $W_3$=0 is established, the coefficients h1 and h2 are approximately equal to each other. The coefficient h3 is independent of $W_3$ and has a constant value.

In the same way, as shown in FIG. 9C, with respect to the pitch angular acceleration $\theta_y''$, the smaller $W_3$ is, the smaller the coefficient p2 becomes and the larger the coefficient p1 becomes. In other words, the coefficients p1 and p2 are each determined according to the position of the third acceleration sensor 2c in the vehicle width direction. When $W_3$=0 is established, the coefficients p1 and p2 are approximately equal to each other. The coefficient p3 is independent of $W_3$ and has a constant value.

As shown in FIG. 9B, the coefficients r1, r2, and r3 are independent of $W_3$ and are constant values with respect to the roll angular acceleration $\theta_x''$.

From FIGS. 9A and 9C, it can be found that if $W_3$ is smaller than a1, that is, if the third acceleration sensor 2c is arranged between the first acceleration sensor 2a and the second acceleration sensor 2b in the vehicle width direction, the respective absolute values of the coefficients h1 and p2 become larger than those in the comparative example where W 3=W 1=a1 is established. Therefore, the accuracy of state quantities that are derived will be higher than those in the comparative example.

As the absolute value difference among the coefficients h1, h2, and h3 becomes smaller, the accuracy of the heave acceleration $z_b$ becomes higher. In the same manner, as the absolute value difference among the coefficients p1, p2, and p3 becomes smaller, the accuracy of the pitch angular acceleration $\theta_y''$ becomes higher. Therefore, in this example, the accuracy is the highest when $W_3$ is equal to zero.

When it is assumed that the third acceleration sensor 2c is located at an intermediate position between the first acceleration sensor 2a and the second acceleration sensor 2b in the vehicle width direction, that is, when it is assumed that $W_3$ is equal to zero, the value of the coefficient p1 is set to be the first reference value.

For example, if the coefficient p1 is included in the range of ±33 percent of the first reference value, a relatively highly accurate pitch angular acceleration $\theta_y''$ can be obtained. Therefore, the position of the third acceleration sensor 2c in the vehicle width direction may be determined such that the coefficient p1 is included in the range of ±33 percent of the first reference value.

$W_3$ obtained when the coefficient p1 is +33 percent of the first reference value is obtained from Equation (6), and the value obtained is denoted as −a3. $W_3$ obtained when the coefficient p1 is −33 percent of the first reference value is obtained from Equation (6), and the value obtained is denoted as a2. In this case, $W_3$ may be defined in the range from −a3 to a2. $W_3$ being included in the range from −a3 to a2 corresponds to the third acceleration sensor $2c$ being arranged near the intermediate position between the first acceleration sensor $2a$ and the second acceleration sensor $2b$ in the vehicle width direction.

In addition, when it is assumed that the third acceleration sensor $2c$ is located at an intermediate position between the first acceleration sensor $2a$ and the second acceleration sensor $2b$ in the vehicle width direction, that is, when it is assumed that $W_3$ is equal to zero, the value of the coefficient p2 may be set to be the second reference value. $W_3$ obtained when the coefficient p2 is +33 percent of the second reference value is obtained from Equation (6), and the value obtained is denoted as a4 (not shown). $W_3$ obtained when the coefficient p2 is −33 percent of the second reference value is obtained from Equation (6), and the value obtained is denoted as −a5 (not shown). In this case, $W_3$ may be set in a range from the larger of −a3 and −a5 to the smaller of a2 and a4. It can be expected that −a3 and −a5 are equivalent values and that a2 and a4 are also equivalent values.

The ±33 percent range is an example range set based on a 67 percent credible interval. The ±33 percent range can be determined by experiment or simulation according to the accuracy of the required state quantities, etc. For example, the range may be narrower than ±33 percent or wider than ±33 percent.

Even if the installation position of the third acceleration sensor $2c$ is limited due to the structure of the vehicle 30 or other factors and the third acceleration sensor $2c$ cannot be installed at the position where $W_3$ is equal to zero, a heave acceleration $z_b$ and a pitch angular acceleration $\theta_y''$ that are relatively highly accurate can be obtained by installing the third acceleration sensor $2c$ at a position where $W_3$ is within the range from −a3 to a2.

As described above, according to the first arrangement of the embodiment, by making $W_3$ different from $W_1$, each of the heave acceleration $z_b$ and the pitch angular acceleration $\theta_y''$ can be derived using detected values from the three acceleration sensors 2. Therefore, the accuracy of each of the heave acceleration $z_b$ and the pitch angular acceleration $\theta_y''$ can be improved.

By arranging the third acceleration sensor $2c$ near an intermediate position between the first acceleration sensor $2a$ and the second acceleration sensor $2b$ in the vehicle width direction, the difference in absolute values among the coefficients can be further reduced, and the accuracy of the state quantities can thus be further improved. By arranging the third acceleration sensor $2c$ at the intermediate position, the accuracy of the state quantities can be further increased.

Therefore, more accurate state quantities at the center of gravity position g1 can be acquired using three acceleration sensors 2 arranged in the vehicle 30.

(Second Arrangement of Acceleration Sensors 2)

Another arrangement of the acceleration sensors 2 will be explained next. In the following, an explanation will be given mainly for the differences from the first arrangement.

Figure 10:
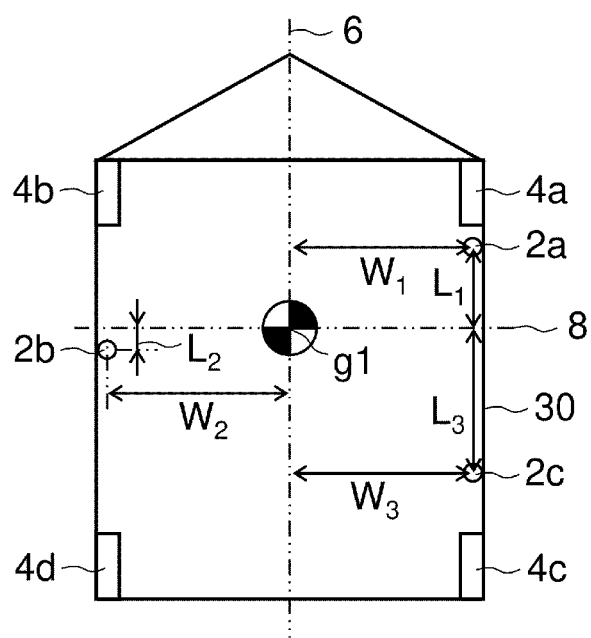
FIG. 10 is a diagram schematically showing the second arrangement of acceleration sensors shown in FIG. 1.
Figure 10:
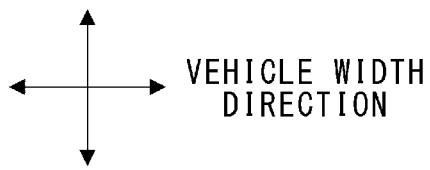

FIG. 10 is a diagram schematically showing the second arrangement of the acceleration sensors 2 shown in FIG. 1. The arrangement of the first acceleration sensor $2a$ is the same as that in the first arrangement. The arrangement of the third acceleration sensor $2c$ is the same as that in the comparative example and is arranged near the right rear wheel $4c$. $W_1$ is equal to $W_3$. $L_3$ is the same as that in the first arrangement.

The second acceleration sensor $2b$ is arranged further to the back side compared to the first arrangement. The second acceleration sensor $2b$ is arranged between the first acceleration sensor $2a$ and the third acceleration sensor $2c$ in the front-back direction of the vehicle. In the example shown in the figure, the second acceleration sensor $2b$ is located at an intermediate position between the first acceleration sensor $2a$ and the third acceleration sensor $2c$ in the front-back direction of the vehicle. The second acceleration sensor $2b$ is arranged near the virtual line 8, slightly behind the virtual line 8. $W_2$ is the same as that in the first arrangement. If $L_3$ is equal to $L_1$, $L_2$ may be zero, and the second acceleration sensor $2b$ may be arranged on the virtual line 8.

In the previously described Equations (1) to (6), if the second acceleration sensor $2b$ is arranged behind the virtual line 8, $L_2$ is assumed to have a negative value, and if the second acceleration sensor $2b$ is arranged in front of the virtual line 8, $L_2$ is assumed to have a positive value.

In the second arrangement, $L_2$ is different from $L_1$, so "$L_2-L_1$" is not zero. Therefore, in the previously mentioned Equation (5), the coefficient of the third vertical acceleration $z_{s3}$ is not zero. The respective coefficients of the first vertical acceleration $z_{s1}$ and the second vertical acceleration $z_{s2}$ in Equation (5) are also not zero. Therefore, the value of the roll angular acceleration $\theta_x''$ reflects the vertical acceleration detected by each of the three acceleration sensors 2, thereby resulting in a relatively small error from the true value.

In the previously described Equation (4), the respective coefficients of the first vertical acceleration $z_{s1}$, the second vertical acceleration $z_{s2}$, and the third vertical acceleration $z_{s3}$ are not zero. Therefore, the value of the heave acceleration $z_b$ reflects the vertical acceleration detected by each of the three acceleration sensors 2, thereby resulting in a relatively small error from the true value.

On the other hand, since $W_1$ is equal to $W_3$, "$W_3-W_1$" is zero. Therefore, in the previously described equation (6), the coefficient of the second vertical acceleration $z_{s2}$ becomes zero. Therefore, the pitch angular acceleration $\theta_y''$ becomes unrelated to the detected second vertical acceleration $z_{s2}$, and the error from the true value is likely to become relatively large just like in the comparative example.

Figure 11A:
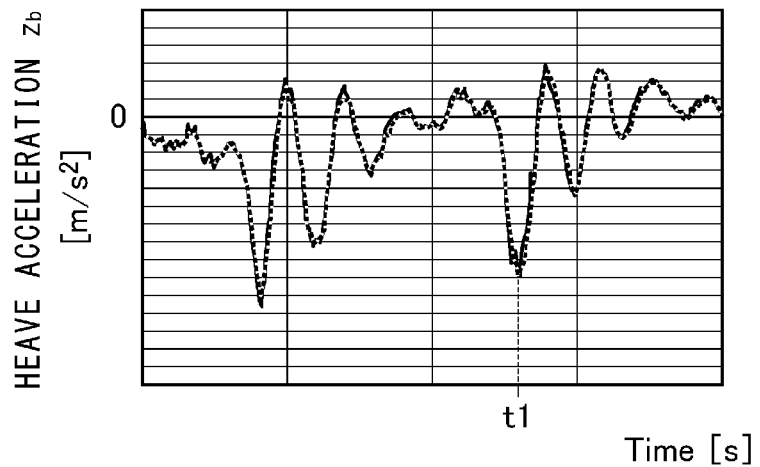
FIGS. 11A to 11C are diagrams showing time changes of state quantities obtained in the second arrangement in FIG. 10 and the true values of the state quantities.
Figure 11B:
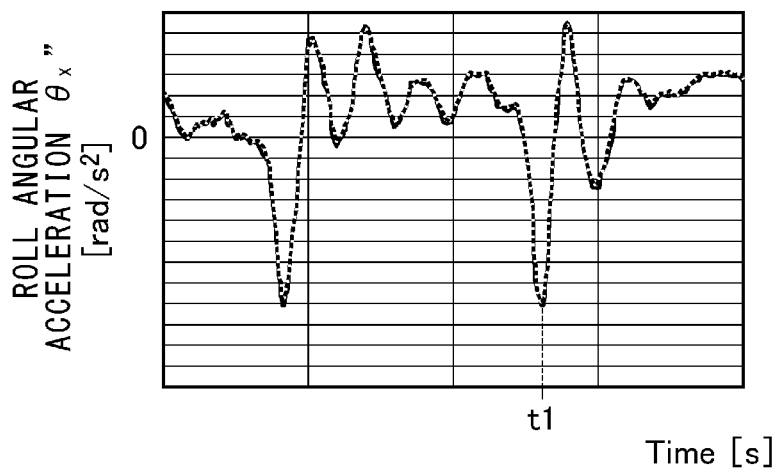
Figure 11C:
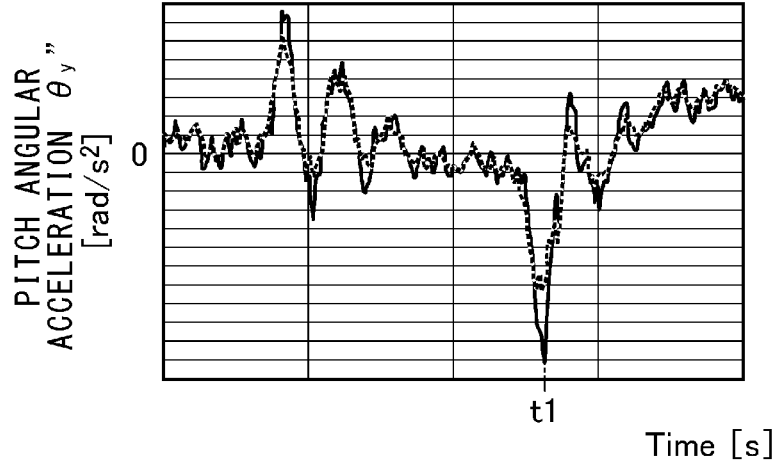

FIGS. 11A to 11C show time changes of state quantities obtained in the second arrangement in FIG. 10 and the true values of the state quantities. FIG. 11A shows the heave acceleration $z_b$, FIG. 11B shows the roll angular acceleration $\theta_x''$, and FIG. 11C shows the pitch angular acceleration $\theta_y''$.

In FIGS. 11A to 11C, solid waveforms represent state quantities obtained in the second arrangement, and dashed waveforms represent true values. These figures also show state quantities derived under the same conditions as those in FIGS. 4A to 4C.

The heave acceleration $z_b$ and the roll angular acceleration $\theta_x''$ roughly match the respective true values and are improved compared to those in the comparative example. On the other hand, the error of the pitch angular acceleration $\theta_y''$ from the true value is equivalent to that in the comparative example.

Figure 12A:
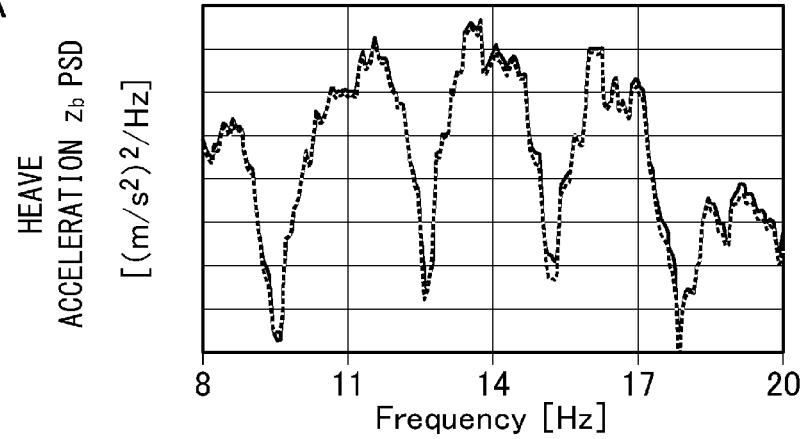
FIGS. 12A to 12C are diagrams showing power spectral densities of the state quantities of FIG. 11A to 11C and the true values of the state quantities.
Figure 12B:
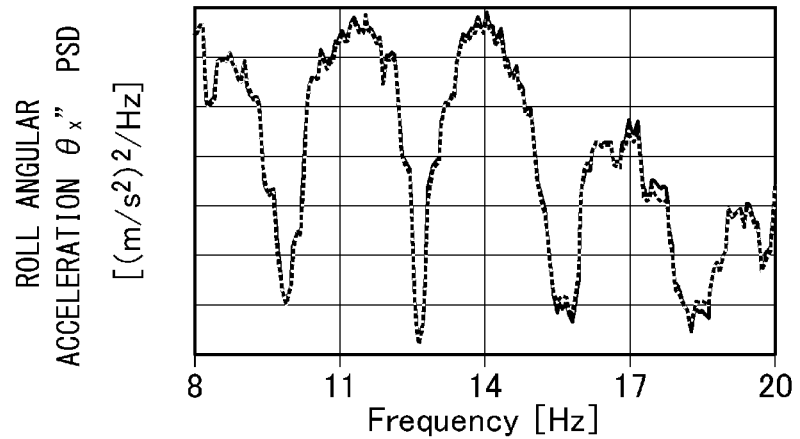
Figure 12C:
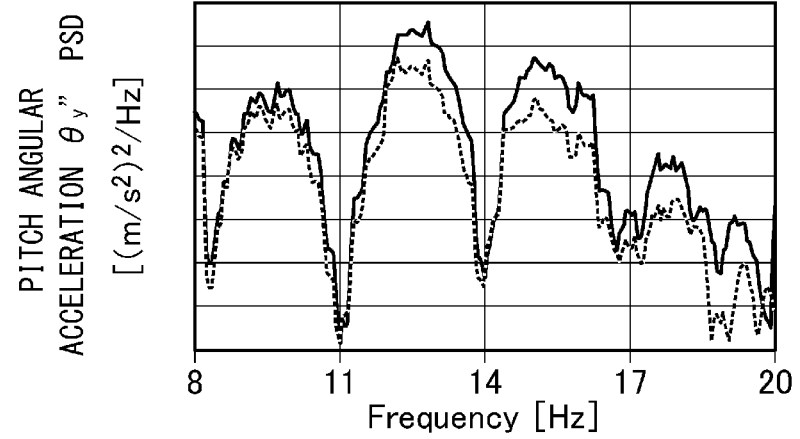

FIGS. 12A to 12C show power spectral densities of the state quantities of FIG. 11A to 11C and the true values of the state quantities. FIG. 12A shows the power spectral density of the heave acceleration $z_b$ of FIG. 11A, FIG. 12B shows the power spectral density of the roll angular acceleration $\theta_x''$ of FIG. 11B, and FIG. 12C shows the power spectral density of the pitch angular acceleration $\theta_y''$ of FIG. 11C.

The heave acceleration $z_b$ and the roll angular acceleration $\theta_x''$ match the respective true values relatively well and are improved compared to those in the comparative example.

On the other hand, in the power spectrum density of the pitch angular acceleration $\theta_y''$, the error from the true value is equivalent to that in the comparative example.

The second acceleration sensor 2b does not need to be located at an intermediate position between the first acceleration sensor 2a and the third acceleration sensor 2c in the front-back direction of the vehicle. If the second acceleration sensor 2b is located between the first acceleration sensor 2a and the third acceleration sensor 2c in the front-back direction of the vehicle, the accuracy of state quantities that are derived is higher than that in the comparison example where $L_2$ is equal to $L_1$, and the closer to the intermediate position of these, the higher the accuracy. Therefore, an example of the preferred range of $L_2$ will be explained below.

Figure 13A:
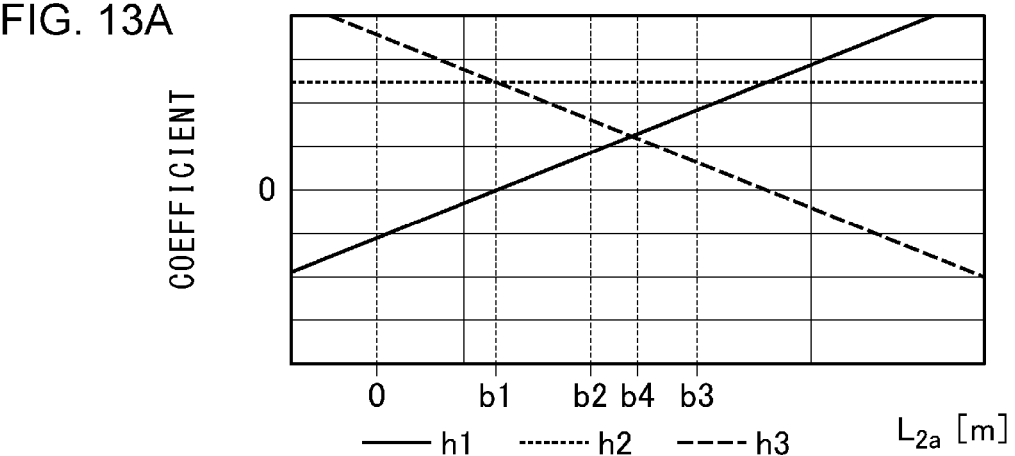
FIGS. 13A to 13C are diagrams showing the relationship between the coefficients of equations representing the state quantities in the second arrangement and Lea.
Figure 13B:
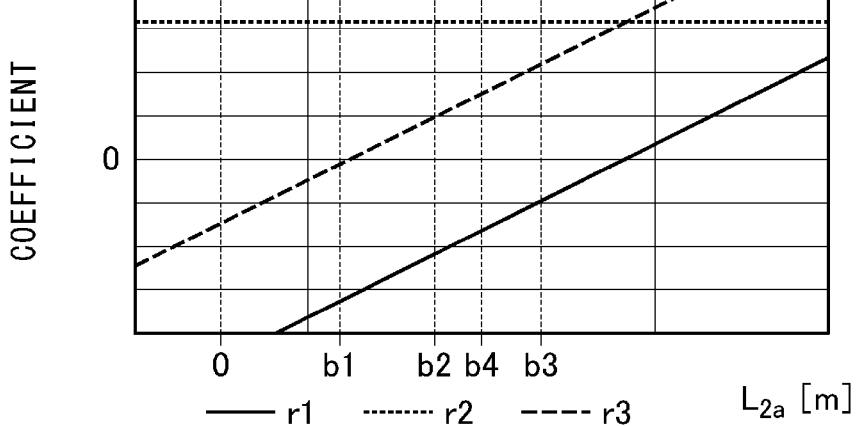
Figure 13C:
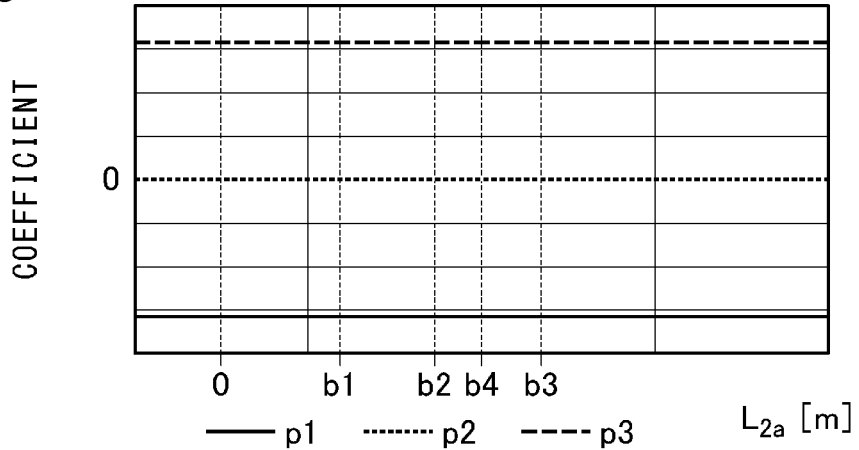

FIGS. 13A to 13C show the relationship between the coefficients of equations representing the state quantities in the second arrangement and $L_{2a}$. $L_{2a}$ represents the distance in the front-back direction of the vehicle from the virtual line passing through the center of the left front wheel 4b and the center of the right front wheel 4a and is used for convenience of explanation. $L_{2a}$ can be converted to $L_2$ using the coordinates of the center of gravity position g1.

FIG. 13A shows the coefficients h1, h2, and h3 in Equation (7) representing the heave acceleration $z_b$. FIG. 13B shows the coefficients r1, r2, and r3 in Equation (8) representing the roll angular acceleration $\theta_x''$. FIG. 13C shows the coefficients p1, p2, and p3 in Equation (9) representing the pitch angular acceleration $\theta_y''$.

In these relationships, $W_1$, $W_2$, $W_3$, $L_1$, and $L_3$ are set to be constant values in the second arrangement, and $L_{2a}$ is changed. This is equivalent to changing $L_2$. The vertical axis in these figures represents the coefficient values, and the horizontal axis represents $L_{2a}$. The value of $L_{2a}$ corresponding to $L_1$ is denoted as b1. In other words, $L_{2a}$=b1 indicates an arrangement according to the comparative example. Further, the value of $L_{2a}$ at the intermediate position between the first acceleration sensor 2a and the third acceleration sensor 2c in the front-back direction of the vehicle is denoted as b4.

As shown in FIG. 13A, with respect to the heave acceleration $z_b$, the larger $L_{2a}$ is, the larger the coefficient h1 becomes and the smaller the coefficient h3 becomes. In other words, the coefficients h1 and h3 are each determined according to the position of the second acceleration sensor 2b in the front-back direction of the vehicle. When $L_{2a}$=b4 is established, the coefficients h1 and h3 are approximately equal to each other. The coefficient h2 is independent of $L_{2a}$ and has a constant value.

In the same manner, as shown in FIG. 13B, the coefficients r1 and r3 become larger as $L_{2a}$ increases with respect to the roll angular acceleration $\theta_x''$. In other words, the coefficients r1 and r3 are each determined according to the position of the second acceleration sensor 2b in the front-back direction of the vehicle. When $L_{2a}$=b4 is established, the respective absolute values of the coefficients r1 and r3 are approximately equal to each other. The coefficient r2 is independent of $L_{2a}$ and has a constant value.

As shown in FIG. 13C, the coefficients p1, p2, and p3 are independent of $L_{2a}$ and are constant values with respect to the pitch angular acceleration $\theta_y''$.

From FIGS. 13A and 13B, it can be found that if $L_{2a}$ is larger than b1, that is, if the second acceleration sensor 2b is arranged between the first acceleration sensor 2a and the third acceleration sensor 2c in the front-back direction of the vehicle, the respective absolute values of the coefficients h1 and r3 become larger than those in the comparative example where $L_{2a}$=b1 is established. Therefore, the accuracy of state quantities that are derived will be higher than those in the comparative example.

As the absolute value difference among the coefficients h1, h2, and h3 becomes smaller, the accuracy of the heave acceleration $z_b$ becomes higher. In the same manner, as the absolute value difference among the coefficients r1, r2, and r3 becomes smaller, the accuracy of the roll angular acceleration $\theta_x''$ becomes higher. Therefore, in this example, the accuracy is the highest when $L_{2a}$ is equal to b4.

When it is assumed that the second acceleration sensor 2b is located at an intermediate position between the first acceleration sensor 2a and the third acceleration sensor 2c in the front-back direction of the vehicle, that is, when it is assumed that $L_{2a}$ is equal to b4, the value of the coefficient r1 is set to be the third reference value.

For example, if the coefficient r1 is included in the range of ±33 percent of the third reference value, a relatively highly accurate roll angular acceleration $\theta_x''$ can be obtained. Therefore, the position of the second acceleration sensor 2b in the front-back direction of the vehicle may be determined such that the coefficient r1 is included in the range of ±33 percent of the third reference value.

$L_{2a}$ obtained when the coefficient r1 is +33 percent of the third reference value is obtained from Equation (5), and the value obtained is denoted as b3. $L_{2a}$ obtained when the coefficient r1 is −33 percent of the third reference value is obtained from Equation (5), and the value obtained is denoted as b2. In this case, $L_{2a}$ may be defined in the range from b2 to b3. $L_{2a}$ being included in the range from b2 to b3 corresponds to the second acceleration sensor 2b being arranged near the intermediate position between the first acceleration sensor 2a and the third acceleration sensor 2c in the front-back direction of the vehicle.

When it is assumed that the second acceleration sensor 2b is located at an intermediate position between the first acceleration sensor 2a and the third acceleration sensor 2c in the front-back direction of the vehicle, that is, when it is assumed that $L_{2a}$ is equal to b4, the value of the coefficient r3 may be set to be the fourth reference value. $L_{2a}$ obtained when the coefficient r3 is +33 percent of the fourth reference value is obtained from Equation (5), and the value obtained is denoted as b5 (not shown). $L_{2a}$ obtained when the coefficient r3 is −33 percent of the fourth reference value is obtained from Equation (5), and the value obtained is denoted as b6 (not shown). In this case, $L_{2a}$ may be set in a range from the larger of b2 and b5 to the smaller of b3 and b6. It can be expected that b2 and b5 are equivalent values and that b3 and b6 are also equivalent values.

Even if the installation position of the second acceleration sensor 2b is limited due to the structure of the vehicle 30 or other factors and the second acceleration sensor 2b cannot be installed at the position where $L_{2a}$ is equal to b4, a heave acceleration $z_b$ and a roll angular acceleration $\theta_x''$ that are relatively highly accurate can be obtained by installing the second acceleration sensor 2b at a position where $L_{2a}$ is within the range from b2 to b3.

According to the second arrangement, by making $L_2$ different from $L_1$, each of the heave acceleration $z_b$ and the roll angular acceleration $\theta_x''$ can be derived using the detected values from the three acceleration sensors 2, and the accuracy thereof can thus be improved.

By arranging the second acceleration sensor 2b near an intermediate position between the first acceleration sensor 2a and the third acceleration sensor 2c in the front-back direction of the vehicle, the difference in absolute values among the coefficients can be further reduced, and the accuracy of the state quantities can thus be further improved. By arranging the second acceleration sensor 2b at the intermediate position, the accuracy of the state quantities can be further increase.

(Third Arrangement of Acceleration Sensors 2)

Still another arrangement of the acceleration sensors 2 will be explained next. In the following, an explanation will be given mainly for the differences from the first arrangement.

Figure 14:
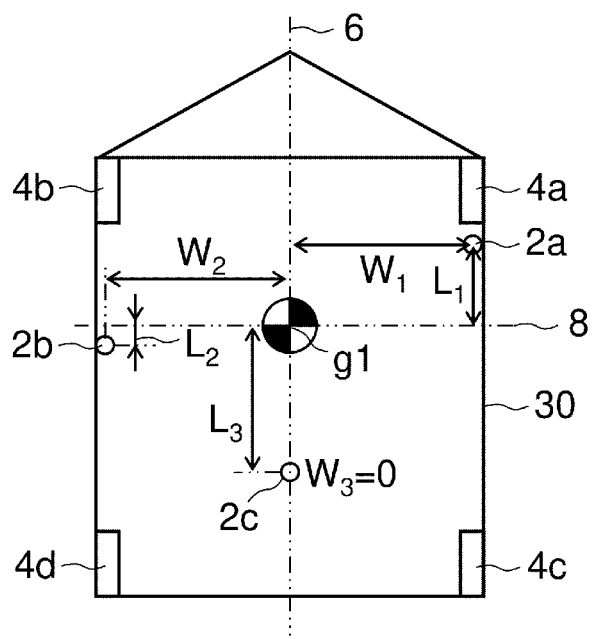
FIG. 14 is a diagram schematically showing the third arrangement of acceleration sensors shown in FIG. 1.
Figure 14:
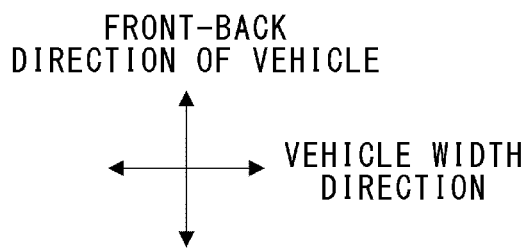

FIG. 14 is a diagram schematically showing the third arrangement of the acceleration sensors 2 shown in FIG. 1. The third arrangement is a combination of the first arrangement and the second arrangement. In other words, the arrangement of the first acceleration sensor 2a and the third acceleration sensor 2c are same as that in the first arrangement, and the arrangement of the second acceleration sensor 2b is the same as that in the second arrangement.

Figure 15A:
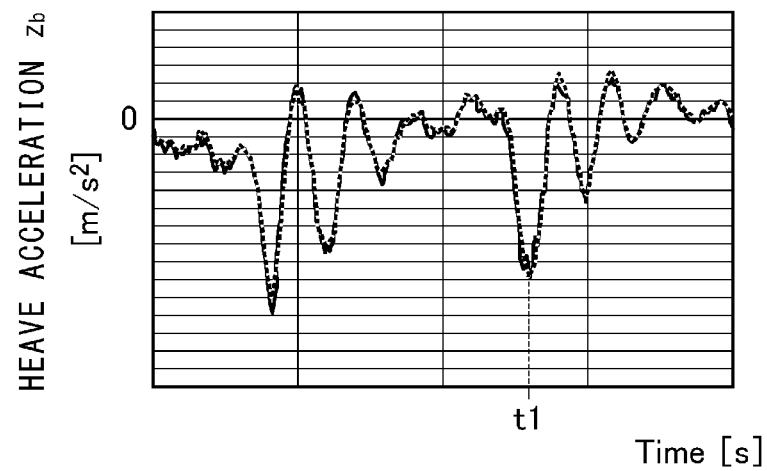
FIGS. 15A to 15C are diagrams showing time changes of state quantities obtained in the third arrangement in FIG. 14 and the true values of the state quantities.
Figure 15B:
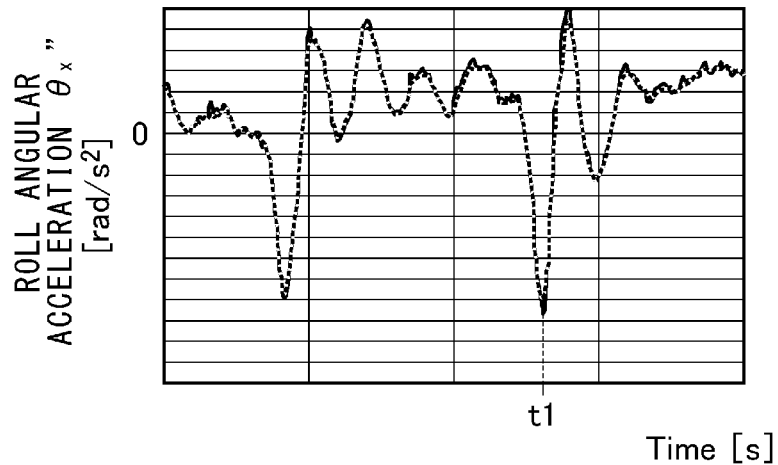
Figure 15C:
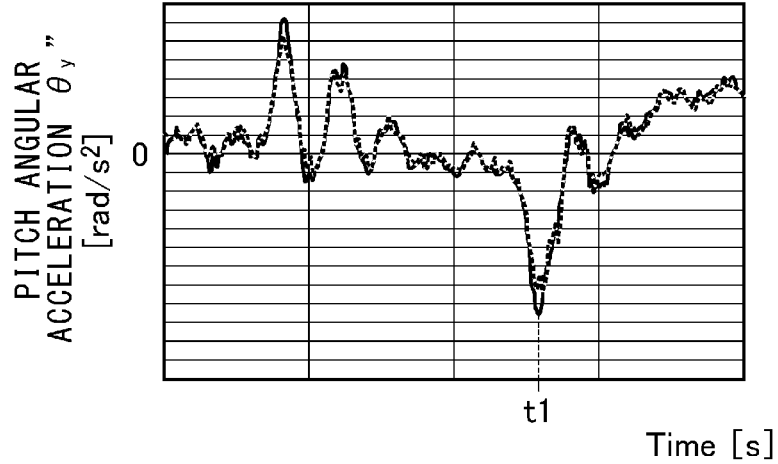

FIGS. 15A to 15C show time changes of state quantities obtained in the third arrangement in FIG. 14 and the true values of the state quantities. FIG. 15A shows the heave acceleration $z_b$, FIG. 15B shows the roll angular acceleration $\theta_x''$, and FIG. 15C shows the pitch angular acceleration $\theta_y''$.

In FIGS. 15A to 15C, solid waveforms represent state quantities obtained in the third arrangement, and dashed waveforms represent true values. These figures also show state quantities derived under the same conditions as those in FIGS. 4A to 4C.

The heave acceleration $z_b$, the roll angular acceleration $\theta_x''$, and the pitch angular acceleration $\theta_y''$ roughly match the respective true values and are improved compared to those in the comparative example.

Figure 16A:
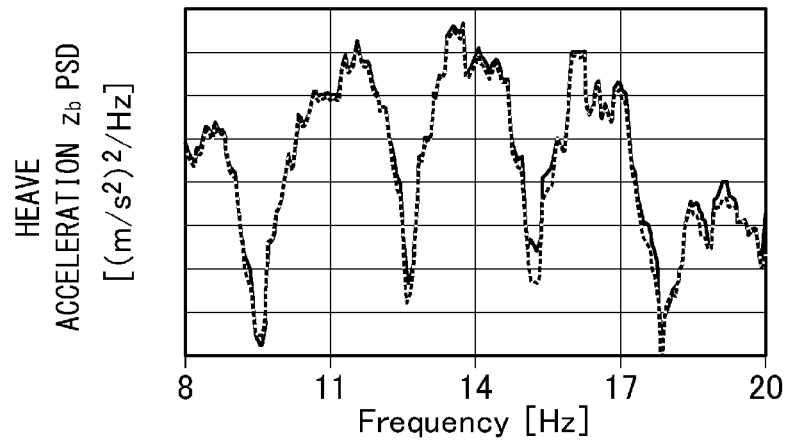
FIGS. 16A to 16C are diagrams showing power spectral densities of the state quantities of FIG. 15A to 15C and the true values of the state quantities.
Figure 16B:
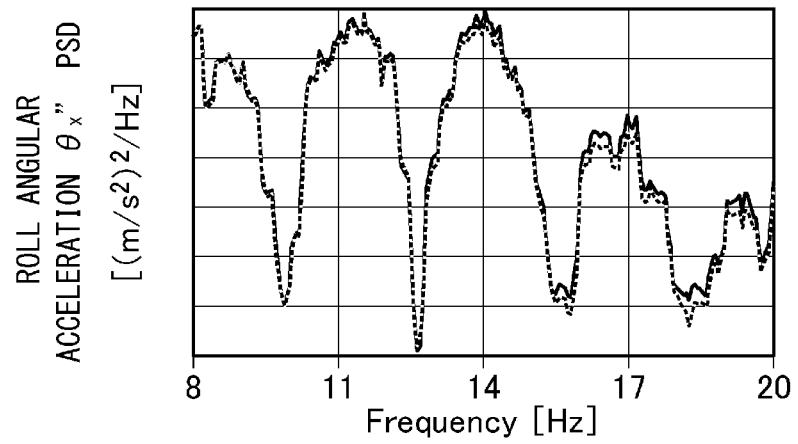
Figure 16C:
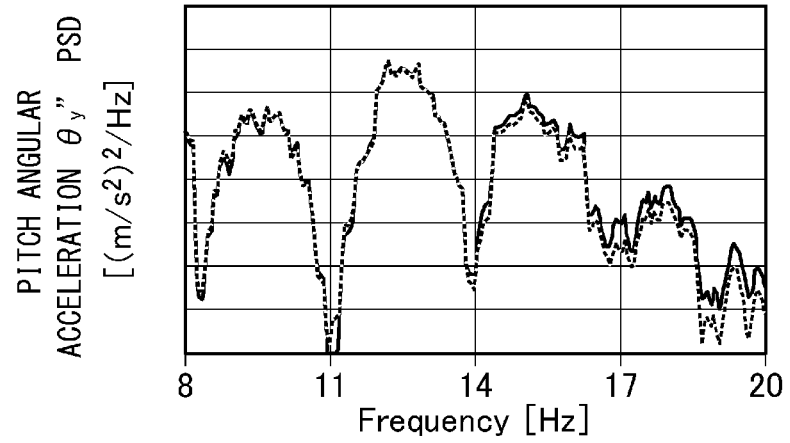

FIGS. 16A to 16C show power spectral densities of the state quantities of FIG. 15A to 15C and the true values of the state quantities. FIG. 16A shows the power spectral density of the heave acceleration $z_b$ of FIG. 15A, FIG. 16B shows the power spectral density of the roll angular acceleration $\theta_x''$ of FIG. 15B, and FIG. 16C shows the power spectral density of the pitch angular acceleration $\theta_y''$ of FIG. 15C.

The power spectral densities of the heave acceleration $z_b$, the roll angular acceleration $\theta_x''$, and the pitch angular acceleration $\theta_y''$ match the respective true values relatively well and are improved compared to those in the comparative example.

According to the third arrangement, the effects of the first arrangement and the second arrangement are combined. In other words, by making $W_3$ different from $W_1$ and making $L_2$ different from $L_1$, each of the heave acceleration $z_b$, the roll angular acceleration $\theta_x''$, and the pitch angular acceleration $\theta_y''$ can be derived using the detected values from the three acceleration sensors 2, and the accuracy thereof can thus be improved.

Out of the first to third arrangements described above, the third arrangement that allows for the improvement of the accuracy of the roll angular acceleration $\theta_x''$ and the pitch angular acceleration $\theta_y''$ is preferably adopted when both ride comfort and steering stability of the vehicle are to be improved.

On the other hand, if the third arrangement cannot be adopted due to restrictions on the installation position of the acceleration sensors 2 due to the structure of the vehicle 30 or other reasons, the first or second arrangement may be adopted. For example, when improving the ride comfort of the vehicle 30, the first arrangement that can improve the accuracy of the pitch angular acceleration $\theta_y''$ may be adopted. In the case of improving the steering stability of the vehicle 30, the second arrangement that can improve the accuracy of the roll angular acceleration $\theta_x''$ may be adopted.

In other words, at least one of the following conditions needs to be satisfied: the first condition where the third acceleration sensor 2c is located between the first acceleration sensor 2a and the second acceleration sensor 2b in the vehicle width direction; and the second condition where the second acceleration sensor 2b is located between the first acceleration sensor 2a and the third acceleration sensor 2c in the front-back direction of the vehicle.

Described above is an explanation based on exemplary embodiments. The embodiments are intended to be illustrative only, and it will be obvious to those skilled in the art that various modifications to a combination of constituting elements or processes could be developed and that such modifications also fall within the scope of the present disclosure.

For example, the arrangement of the three acceleration sensors 2 may be switched around from front to back or from back to front with respect to the virtual line 8 in the first arrangement described above. In other words, the first acceleration sensor 2a may be arranged near the right rear wheel 4c, the second acceleration sensor 2b may be arranged near the left rear wheel 4d, and the third acceleration sensor 2c may be arranged on the front side of the virtual line 8.

The arrangement of the three acceleration sensors 2 may be switched around from left to right or from right to left with respect to the virtual line 6 in the second arrangement described above. In other words, in the second arrangement, the first acceleration sensor 2a may be arranged near the left front wheel 4b, the second acceleration sensor 2b may be arranged to the right of the virtual line 6, and the third acceleration sensor 2c may be arranged near the left rear wheel 4d.

In the above-described third arrangement, the three acceleration sensors 2 may be switched around from front to back or from back to front with respect to the virtual line 8 or may be switched around from left to right or from right to left with respect to the virtual line 6, or these switching acts may be combined. For example, when switching around the arrangement from front to back or from back to front with respect to the virtual line 8, the first acceleration sensor 2a may be arranged near the right rear wheel 4c, the second acceleration sensor 2b may be arranged to the left of the virtual line 6, and the third acceleration sensor 2c may be arranged on the front side of the virtual line 8. Further, when switching around the arrangement from left to right or from right to left with respect to the virtual line 6, the first acceleration sensor 2a may be arranged near the left front wheel 4b, the second acceleration sensor 2b may be arranged to the right of the virtual line 6, and the third acceleration sensor 2c may be arranged on the back side of the virtual line 8. Further, when switching around the arrangement from front to back or from back to front with respect to the virtual line 8 and switching around the arrangement from left to right or from right to left with respect to the virtual line 6, the first acceleration sensor 2a may be arranged near the left rear wheel 4d, the second acceleration sensor 2b may be arranged to the right of the virtual line 6, and the third acceleration sensor 2c may be arranged on the front side of the virtual line 8.

In the case where the installation position of the acceleration sensors 2 is limited due to the structure of the vehicle 30 or other reasons, the arrangement according to these exemplary variations can also be adopted. These exemplary variations allow the acceleration sensor 2 to be arranged at an appropriate position in accordance with the structure of the vehicle 30, and the above-described effects according to the embodiment can be obtained.

What is claimed is:

1. A vehicle travel control system comprising:

a first acceleration sensor arranged closer to one wheel than the center of gravity position of a sprung structure of a vehicle, the first acceleration sensor detecting vertical acceleration;

a second acceleration sensor arranged in an area different from an area where the first acceleration sensor is arranged, out of two areas divided by a virtual line passing through the center of gravity position in the front-back direction of the vehicle, the second acceleration sensor detecting vertical acceleration;

a third acceleration sensor arranged in an area different from an area where the first acceleration sensor is arranged, out of two areas divided by a virtual line passing through the center of gravity position in the vehicle width direction, the third acceleration sensor detecting vertical acceleration; and a control device configured to derive heave acceleration, roll angular acceleration, and pitch angular acceleration at the center of gravity position based on the vertical acceleration detected by each of the first acceleration sensor, the second acceleration sensor, and the third acceleration sensor, wherein at least one of the following conditions is satisfied:

a first condition where the third acceleration sensor is located between the first acceleration sensor and the second acceleration sensor in the vehicle width direction; and a second condition where the second acceleration sensor is located between the first acceleration sensor and the third acceleration sensor in the front-back direction of the vehicle, wherein the first condition includes a condition where the third acceleration sensor is located near an intermediate position between the first acceleration sensor and the second acceleration sensor in the vehicle width direction, and the second condition includes a condition where the second acceleration sensor is located near an intermediate position between the first acceleration sensor and the third acceleration sensor in the front-back direction of the vehicle, and wherein the first condition includes a condition where the third acceleration sensor is located near a virtual line passing through the center of gravity position in the front-back direction of the vehicle, and the second condition includes a condition where the second acceleration sensor is located near a virtual line passing through the center of gravity position in the vehicle width direction.

2. The vehicle travel control system according to claim 1 that is not provided with any acceleration sensors that detect vertical acceleration other than the first to third acceleration sensors.

* * * * *